Figure 2:
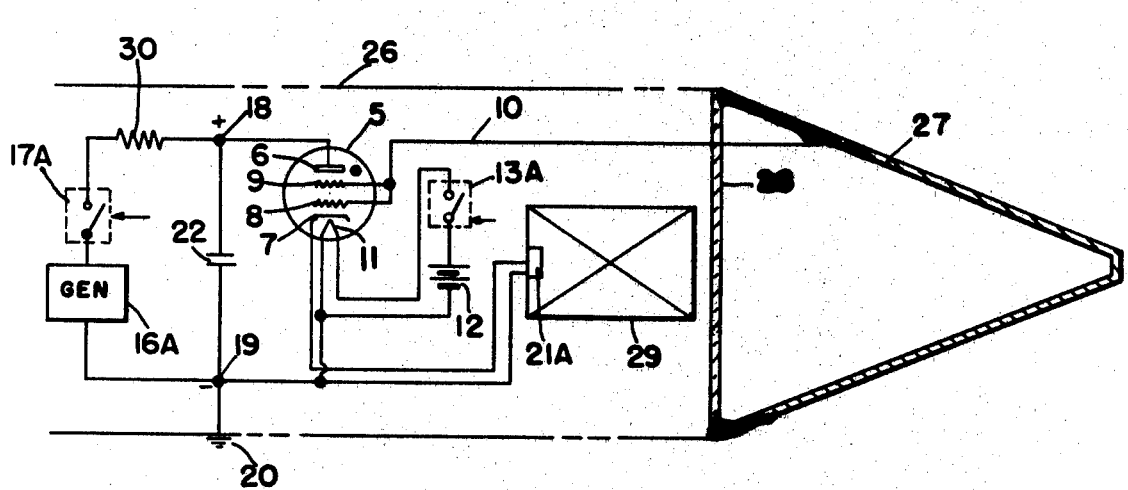

United States Patent [19]
Chernoff

[11] 3,880,082
[45] Apr. 29, 1975

[54] ELECTRICALLY-CONTROLLED TRIGGERING CIRCUIT FOR FUZES AND THE LIKE

[75] Inventor: Paul Chernoff, Adelphi, Md.

[73] Assignee: The United States of America as represented by the Secretary of the Army, Washington, D.C.

[22] Filed: Sept. 28, 1966

[21] Appl. No.: 583,495

[52] U.S. Cl. ............................................ 102/70.2 R
[51] Int. Cl. ............................................ F42b 11/00
[58] Field of Search ................... 102/70.2; 317/80

[56] References Cited
UNITED STATES PATENTS
| | | | |
|---|---|---|---|
| 2,890,655 | 6/1959 | Apstein | 102/70.2 |
| 3,009,077 | 11/1961 | Jacob | 102/70.2 X |
| 3,088,410 | 5/1963 | Taylor | 102/70.2 |

Primary Examiner—Verlin R. Pendegrass
Attorney, Agent, or Firm—Nathan Edelberg; Robert P. Gibson; A. Victor Erkkila

[57] ABSTRACT

A thyratron tube provides a triggering switch in the firing circuit of a fuze on like load device in connection with a storage capacitor which is charged to a relatively-high discharge voltage. The two control grids of the thyratron tube are connected to an insulated electrostatic control lead or conductive element and develop a negative charge or bias which holds the thyratron open. Upon contact of the control lead or element with an external body the negative charge or bias is reduced or changed in a positive direction to trigger the thyratron to conduction, thereby applying the capacitor charge to the load device.

4 Claims, 2 Drawing Figures

PATENTED APR 29 1975 3,880,082

INVENTOR.
PAUL CHERNOFF
BY
ATTORNEYS.

ELECTRICALLY-CONTROLLED TRIGGERING CIRCUIT FOR FUZES AND THE LIKE

The present invention relates to electrostatically-controlled triggering circuits for electronic devices, and has for its primary object the provision of an improved circuit of this type which is of simplified circuit construction and provides a high degree of sensitivity in operation.

It is a further object of this invention to provide an electrostatically-controlled triggering circuit for electronic devices which utilizes an improved thyratron control and a minimum of circuitry components to electrostatically control a thyratron.

It is also a further and important object of this invention to provide an improved electrostatically controlled firing circuit for fuzes and the like, as used in artillery shells and other gunfire components, which eliminates complicated mechanical motions and structural elements, switches, and other control devices such a piezoelectric elements for triggering a projectile or the like on contact.

In accordance with the invention, a simple thyratron firing circuit is provided in which the peculiarities of electrostatics is employed as a means for triggering a thyratron to fire and close a control circuit, generally for discharging a capacitor. A thyratron of the dual coincident type, for example a type known commercially as 2238A, is used successfully in this circuit. This thyratron employs two control grids between an anode and a cathode element, the latter being separately heated. As normally used in a circuit, the grids of this thyratron are negatively biased prior to building up a high potential between the plate and the cathode. Under normal operation, a plate-to-cathode discharge will take place when the grids are made more positive relative to the initial negative potential. The tube is operated in such a manner that if the negative holding potential is not available then the plate to cathode potential will rise sufficiently high to cause an immediate discharge or conduction through the tube.

In accordance with this invention, the two grids were caused to float without connection to any circuit and without bias. Under this condition of operation it was noted that after reaching 180 volts, for example, between the plate and cathode, the discharge of the tubes did not occur. Initially this appeared to violate what should happen to this particular tube, that is to say, at 180 volts there should be a plate to cathode discharge. If the grids had been tied to either the cathode or the plate, then the high voltage between the plate and cathode would have caused the discharge.

It was found upon further study and investigation that when the grids are left floating without connection, and the high plate-to-cathode potential is achieved, a touching of the grid connections with a body, such as a wire of conducting material, the thyratron would discharge. As a result of this finding it is conceived that an electrostatically controlled triggering circuit could be provided for electronic devices, and particularly firing circuits for fuzes and the like. It appears that the grids collect negative electrons being driven off the cathode and develop a sufficient negative bias to preclude the plate-to-cathode discharge. Thus it was also conceived that a rapid near-surface burst or contact surface burst fuze could be made to function with this control circuit. In this case the grid, instead of floating is tied to the missile or projectile body which, in turn, is electrically isolated. The plate-to-cathode voltage is built up at some point in the trajectory. The charge on the projectile body is negative, thereby holding off the plate-to-cathode discharge. Upon contacting a target surface or fixed body the negative charge is dissipated, thereby causing the grids to go positive or to have the negative bias change in a positive direction, thereby triggering the plate-to-cathode discharge at a predetermined bias value. Thus the tube may operate as a switch to apply the discharge of a capacitor to the firing element of the fuze circuit.

It is also possible that this negative charge can be built up in a tube structure to sufficiently high potential such that when the projectile is approaching the ground, within a few inches, an arc discharge will occur from the projectile, which is connected to this high negative grid potential, to ground resulting in the triggering of the plate to cathode discharge.

The invention will further be understood from the following description, when considered with reference to the accompanying drawings, and its scope is pointed out in the appended claims.

Figure 1:
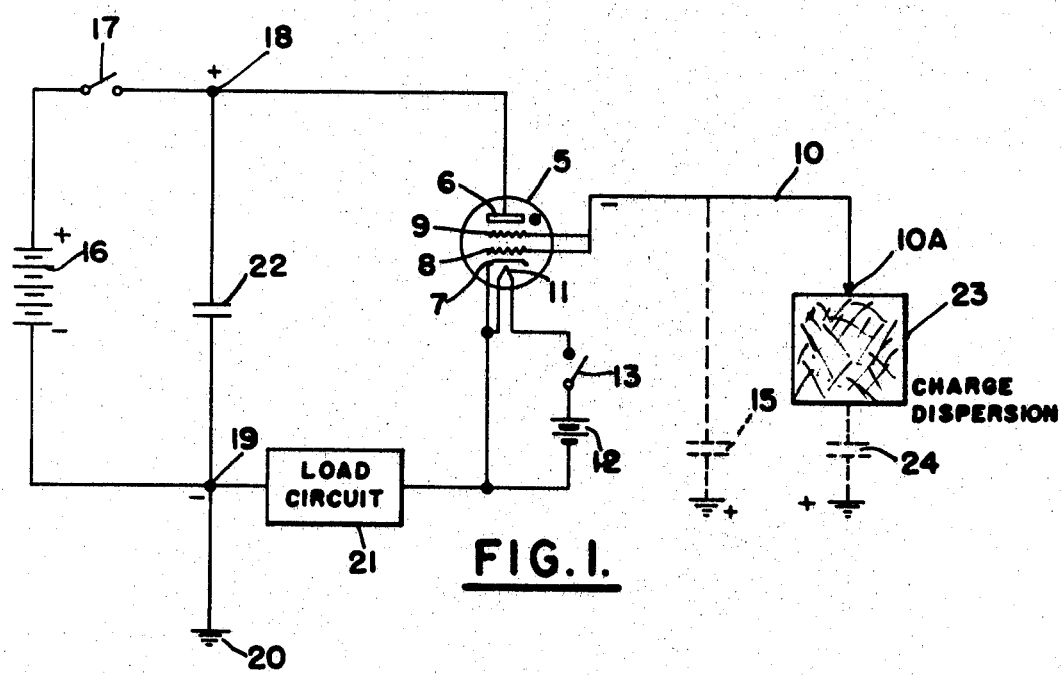

In the drawing,

FIG. 1 is a schematic circuit diagram of an electrostatically-controlled triggering circuit for electronic devices embodying the invention, and FIG. 2 is a further schematic circuit diagram showing the application of the circuit of FIG. 1 to provide a triggering circuit for firing the fuze element of a projectile.

Referring to the drawings, wherein like parts are designated by like reference characters, and referring particularly to FIG. 1, a thyratron tube 5 of the dual coincidence type referred to, and representing the commercial type 2238A, is provided with an anode or anode electrode 6, a cathode or cathode electrode 7, and two end opposed control grids 8 and 9 in consecutive relation between the cathode and anode and connected externally to a common lead 10 which is the electrostatic control lead therefor. A heater element 11 for the cathode 7 is energized from a suitable supply means such as a battery 12 through a control switch 13. The two grids 8 and 9, together with the control lead 10 are negative with respect to ground by reason of stray capacity coupling as indicated at 15.

A source of operating current for the thyratron at a proper voltage is indicated by the battery 16 connected at its positive terminal through a control switch 17 with the anode 6 and the high potential terminal 18. The negative terminal of the supply source 16 is connected to a low potential negative terminal 19 and system ground 20. From the terminal 19, the operating circuit is continued to the cathode 7 and through a load circuit or device 21, which may be any suitable circuit or device which is to be triggered in operation through the electrostatic control of the thyratron 5. Between the terminals 18 and 19 is connected a storage capacitor 22 for operating the load circuit 21 after being charged from the source 16 by the closure of the switch 17 and subsequent firing of the thyratron 5.

When the operating switch 17 is closed, and the cathode is preheated by closure of the switch 13, operating current flows through the cathode-to-anode path of the tube 5 under control of the grids 8 and 9. With the lead 10 disconnected or out of contact with any external body, the grids are left floating and a high plate-to-cathode potential is achieved of normally 180 volts from the source 16 in the present example. The grids collect negative bias to preclude the plate-to-cathode discharge.

When the control lead 10 is provided with a terminal end 10A and this is brought into contact with an external body of conducting material, such as a screen or wire mesh frame 23, the negative charge is dissipated or dispersed over the area of the element 23 and causes the grids 8 and 9 to be positive-going in bias, due to the capacity to ground of the device 23 as indicated at 24.

Thus the fundamental theory of operation of the circuit of the present invention involves the operation of the grid or grids as collectors of high energy electrons from the cathode, and because of the high degree of isolation between the grid or grids and the other electrodes, the grids develop a negative holding bias. This can be considered equivalent to charging a capacitor, while the grids represent a negative plate of the capacitor. The touching of the grids by another object external thereto results in a change of capacitance because the object represents an increase in plate area for the equivalent capacitor. The increase in capacitor area results in an increase in capacity which, in turn, reduces the negative voltage or is the equivalent of placing a more positive bias on the grids, thereby causing the triggering of the thyratron 5 and the release of energy from the supply or storage capacitor 22 into the load circuit 21. The latter may be any circuit or device operable of response to the discharge of the capacitor 22, such as fuze elements of projectiles and the like.

The circuit of the present invention is adapted for use in controlling the discharge of the operating capacitor 22 through triggering of the thyratron 5 in response to the sensitive electrostatic control provided by the grid connection 10 or the like. In this case the storage capacitor 22 is charged from the source 16 through the switch 17 to maximum voltage which in this may be assumed to be 180 volts and is then ready to apply the discharge current therefrom to the load circuit or load device 21 through operation of the thyratron 5. The latter is controlled by sensitive grid elements 8 and 9 connected with the circuit lead 10 which, in turn, is in a condition to go positive from a negative condition when touched to another body which dissipates the charge as before mentioned.

Referring now to the FIG. 2 along with FIG. 1, the fundamental circuit of FIG. 1 is used herein to control and fire the fuze and charge of a projectile indicated in outline at 26 and having a forward nose cone 27 of metal insulated from the main body electrically as indicated at 28. Inside the projectile casing is the circuitry of FIG. 1 applied to the detonation of a charge 29 through an electrically-operated detonator 21A which is the load device of the present example. This device is connected into circuit between the cathode 7 and the terminal 19, as before, to receive firing current from the capacitor 22 through the thyratron device 5. This occurs when the latter is triggered by change in grid voltage on the grids 8 and 9 as provided through the lead 10 which is now connected with the conductive nose cone 27. Thus the nose cone 27 corresponds to the body 23 of FIG. 1 for effecting a charge dispersion when it touches ground or other objects such as a target for example.

In the present example the capacitor 22 is charged from a generator 16A instead of the battery, and is driven when the projectile is in rotation. In this case the switch 17A is of the inertial type which closes when the projectile is fired into operation. Likewise the cathode switch 13A may be inertially operated by the setback force upon firing of the projectile. In order to provide for a longer and safer travel time of the projectile, the capacitor 22 is charged at a lower rate than in the example of FIG. 1 by the use of a series resistor 30 or like means in the circuit, for controlling the flow of charging current thereto from the generator 16A.

As in the preceding example, the grids 8 and 9 of the thyratron, in connection with the conducting element 27 of the projectile, gradually build up a negative potential due to the collection of negative electrons which are driven off from the cathode during the flight of the projectile and after arming by closure of the inertial switches 17A and 13A. They eventually provide sufficient negative bias to preclude the plate-to-cathode discharge as the capacitor 22 comes to full charge from the generator 16A. Under this condition a touching of the grid circuit with any body or anything connected with it such as the element 27, will cause dissipation of the charge and the grids to go positive or in a positive direction thereby triggering the plate-to-cathode discharge. The full output of the completely-charged capacitor 22 is then applied to the detonator 21A which fires the charge 29.

It is possible that a sufficiently high potential may be developed such that when the projectile is approaching ground for example, within a short distance therefrom such as a few inches, an arc discharge will occur from the projectile, which is connected to the high negative grid potential, to the ground and thereby resulting on the triggering of the plate-to-cathode discharge as before.

The theory of operation of a circuit in accordance with the invention thus involves the grid acting as a collector of high energy electrons and because of its high insulation resistance, that is, the resistance between itself and the other electrodes, it developes a negative holding bias. Thereafter the touching of the grid by any other object results in a change of capacity because the object represents an increase of plate area for the equivalent capacitor of which the grid forms a part. The negative grids then become positive-going in bias progressively until triggering of the thyratron switches on the load, with the charged capacitor as a quick energy source for operation thereof. The system or apparatus of the present invention will thus find application wherever an electronic system may require the redistribution of charge to subsequently cause a plate-to-cathode discharge in a controlling gas thyratron having a floating grid structure as described. The floating grid structure is adapted for any fuzing application in any type of weapons system and appears to have a high degree of reliability in operation. This is partly due to another feature of the apparatus or circuit which permits a minimum number of circuit components to be used and to provide a simplified circuit structure based upon the floating-grid operation.

I claim:

1. An electrostatically-controlled triggering circuit for electronic devices comprising in combination, a gas thyratron tube having an anode, a cathode and at least one control electrode interposed therebetween, a storage capacitor connected in circuit between the anode and cathode, means providing a load circuit interposed between the said capacitor and the cathode for receiving the discharge of said capacitor through the thyratron upon firing, a charging circuit connected with said capacitor, means in said charging circuit for applying to said capacitor a charge at least equal to the discharge voltage of said thyratron, a free-floating insulated electrostatic-coupling conductor connected with said control electrode for collecting therefrom negative electrons driven off from the cathode in operation and received thereby to develop a sufficient negative charge and bias and resultant relatively-high plate-to-cathode impedance to preclude plate-to-cathode discharge, and means providing a conductive terminal connection for said conductor adapted to contact objects in operation and thereby dissipate said negative charge and bias and increasingly bias said control grid in a positive direction for triggering the plate-to-cathode discharge and thereby applying the discharge of the storage capacitor to the load circuit.

2. An electrostatically-controlled triggering circuit for electronic devices as defined in claim 1, wherein the means providing the conductive terminal connection for the control electrode conductor is an insulated electrically-conductive nose cone of a projectile, and wherein the means providing the load circuit includes an electrical detonator for initiating explosive functioning of said projectile.

3. An electrostatically-controlled triggering circuit for electronic devices comprising in combination, a gas thyratron having a cathode and an anode electrode and a free-floating control grid structure in the space path thereof between said electrodes, a storage capacitor and a load circuit connected serially in circuit between said cathode and anode electrodes through said space path, means connected in circuit with said capacitor for applying a charge thereto equal to the firing voltage of said thyratron, an insulated control conductor providing a free-floating external connection with said grid structure for collecting therewith negative electrons driven off from said cathode, and contact means for conductively connecting said conductor with an external body for redistributing the charge on said conductor and firing said thyratron by the resultant charge redistribution and bias change in the positive direction on said grid structure.

4. An electrostatically-controlled firing circuit for fuzes and the like in a projectile, comprising in combination, a gas thyratron tube having an anode, a cathode and at least one interposed free-floating grid element therebetween, a storage capacitor and a load circuit including an electric charge detonator connected serially between said anode and cathode to apply a charge from said capacitor to said detonator upon firing of said thyratron, means for charging said capacitor including a source of direct-current energy connected therewith and an inertial control switch therefor closable by setback on firing of said projectile, and an insulated metallic element on said projectile at the forward end thereof connected with said free-floating grid element to receive therewith a negative electron charge from the cathode and for dissipating said charge upon contact with an objective, thereby to trigger said thyratron and fire said detonator in response to current flow from said capacitor through said thyratron.

* * * * *